United States Patent Office 2,890,488
Patented June 16, 1959

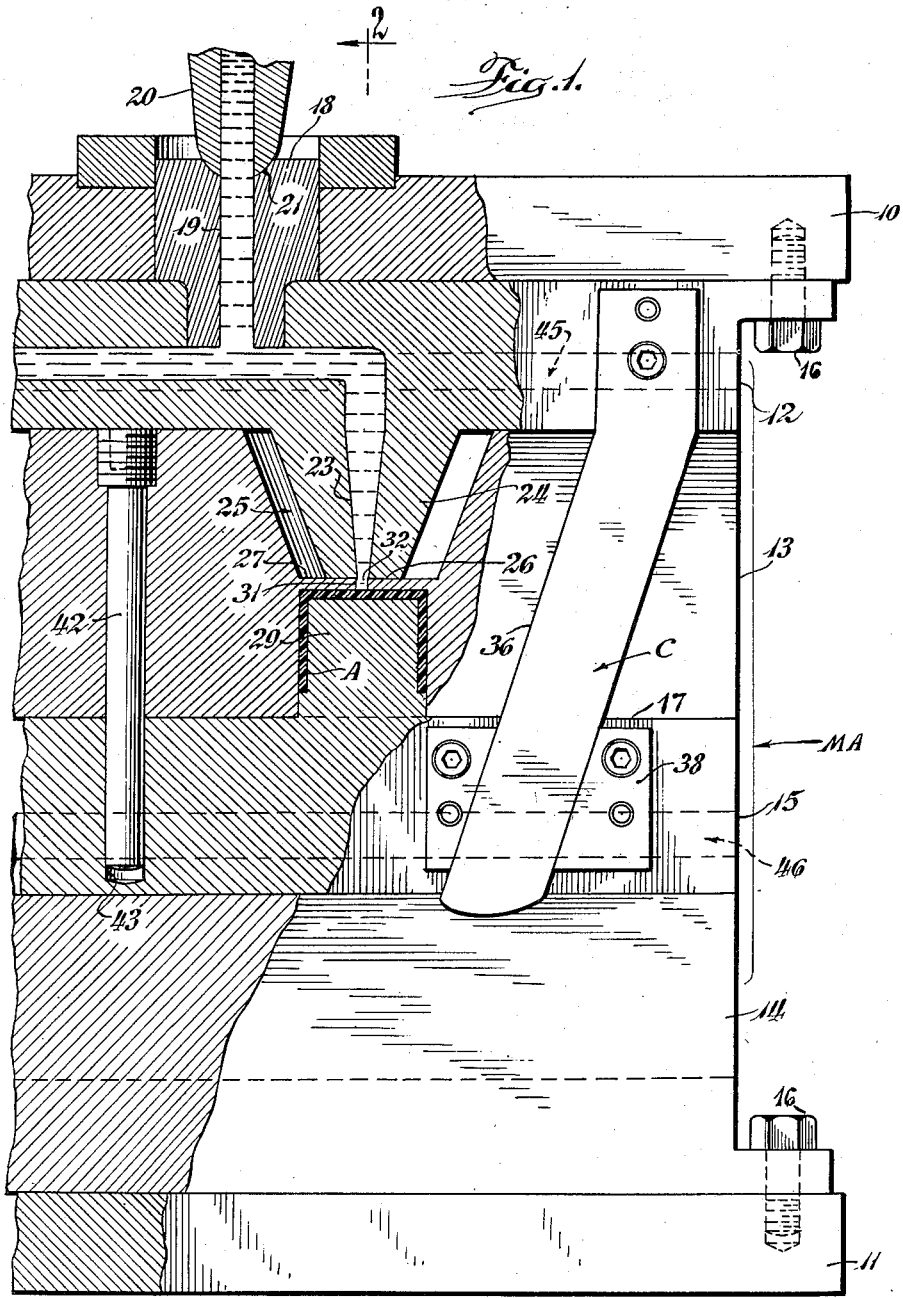

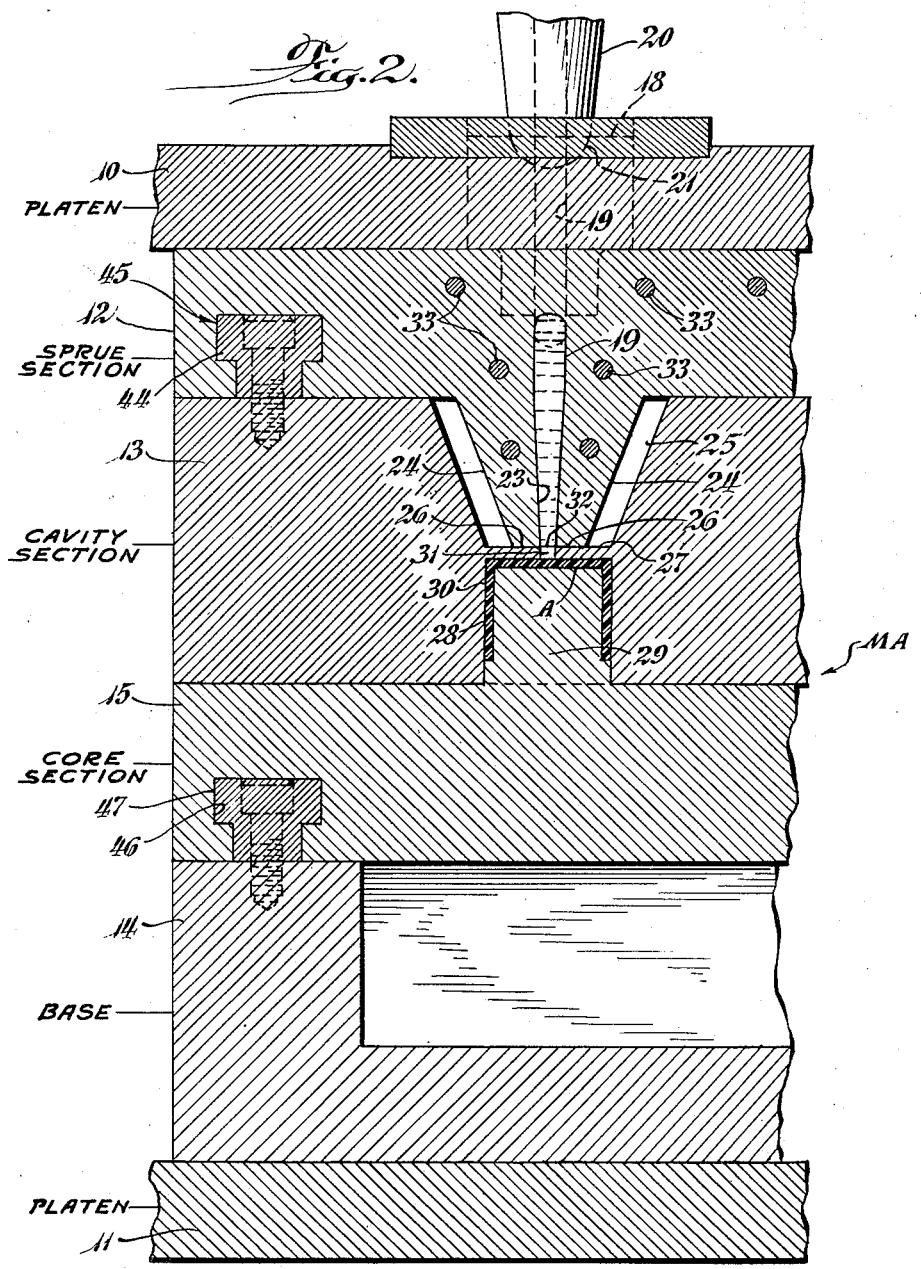

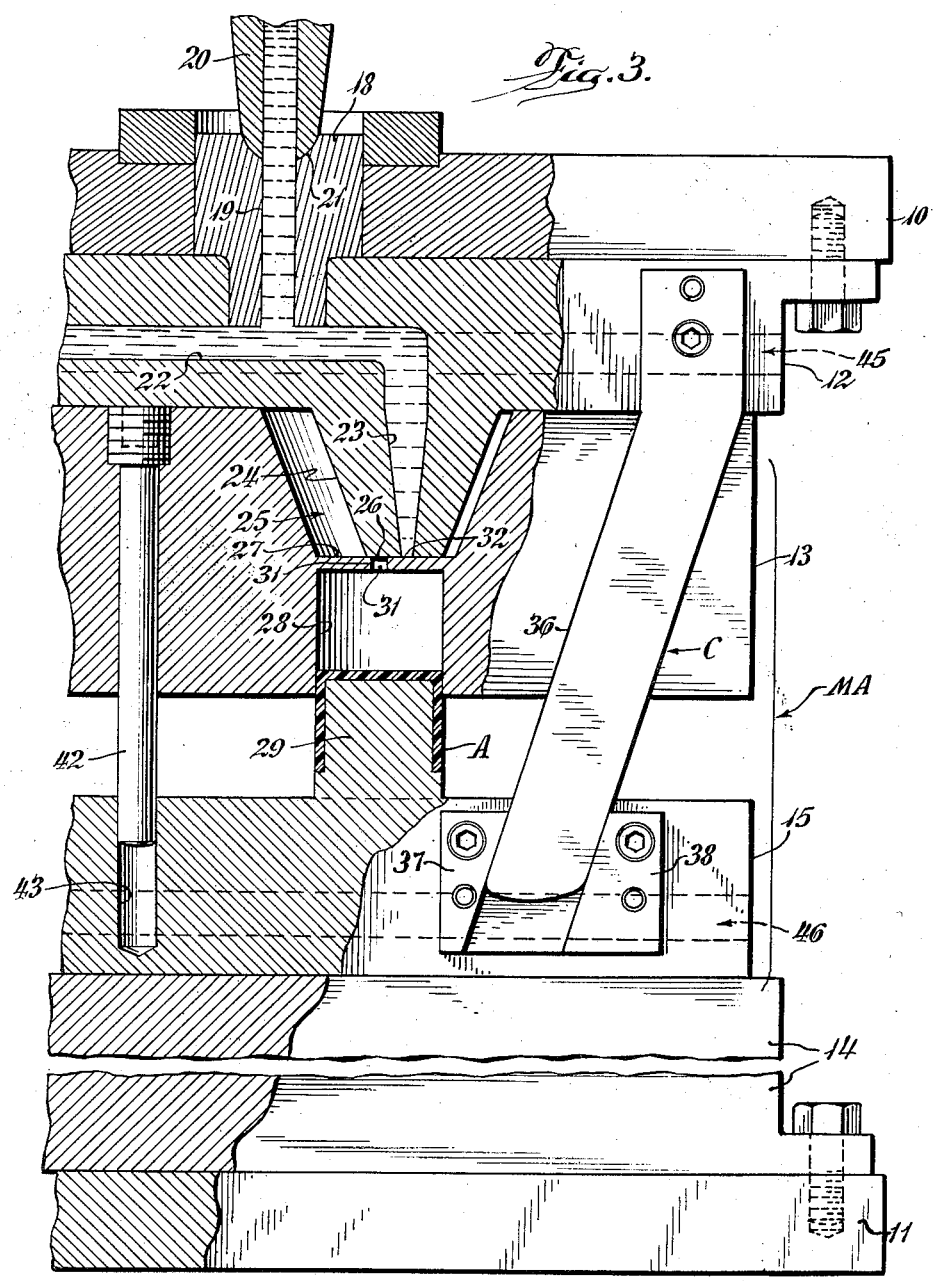

2,890,488

INJECTION MOLDING MACHINE

George W. Gemberling, Melrose Park, Ill., assignor to The Richardson Company, Melrose Park, Ill., a corporation of Ohio Application June 4, 1958, Serial No. 739,730

11 Claims. (Cl. 18—42)

This invention relates to injection molding apparatus and, more particularly, to molding machines of the injection type which use the "hot runner" principle.

As is well known to those familiar with the art of molding, automatic or substantially automatic injection molding machines are currently in use, whereby molded articles, having a variety of shapes, can be rapidly formed from a suitable plastic material. A typical machine of the foregoing type, incorporating a recent improvement, is disclosed in the patent to Kelly 2,770,011 dated November 13, 1956.

A standard injection molding machine includes, generally, a hopper, into which unplasticized molding composition is introduced, a heating cylinder, wherein the molding composition is heated and plasticized, and an injection ram for forcing the plasticized composition from the cylinder into the cavity of a mold. To facilitate injection of the plasticized molding material into a mold cavity, the cylinder is provided with a nozzle which is adapted to be aligned with an appropriate transfer passage or inlet provided in the mold assembly and connected with one or more mold cavities.

In the usual automatic injection machine commonly employed today, there is associated with the injection cylinder immediately beyond the nozzle two platens, one of which is normally stationary and the other of which is movable. Between the platens there is disposed a mold assembly, including two mold sections or dies having complementary recesses, whereby, when the mold sections are placed together in their closed position, a mold cavity is formed. In an automatic machine such as described and, as disclosed in the aforementioned Kelly patent, the plasticized molding composition from the heating cylinder is injected into the cavity of a closed mold, the injection operation stopped, the mold opened and the molded article ejected from the cavity. After ejection of the molded article, the mold is again closed and the cycle repeated. A plurality of articles can be molded simultaneously by providing a number of cavities in the mold rather than a single cavity.

In many operations, after the injection step has been completed, the molding composition present in the transfer passages of the mold preceding the cavity hardens in the same manner as the molded article and, accordingly, this hardened material in the passages must be removed along with the molded article in order to permit subsequent transfer of molding composition through the passages. Normally, the hardened material in these passages, sometimes referred to as the "sprue," is attached to the molded article and requires separation from the article, either by hand or automatic means, upon removal of the molded article from the mold.

In certain types of injection molding machines, heating means are provided to maintain the molding composition in the transfer passages leading to the mold cavities in a continually heated and plasticized condition. The use of such a technique is sometimes referred to as a "hot runner" process. In machines of the latter type, the problem of solidified sprues is eliminated and molding operations are much more efficient and rapid. There is however, one disadvantage of a hot runner operation, in that some heated and plasticized molding compositions continue to "ooze" or "drool" from the transfer passage orifices which are open to the mold cavity at the time the mold is opened for removal of the molded article. This problem, while not acute with all molding compositions, does present a rather serious problem with respect to the injection molding of nylon. A number of molding compositions, when used in a hot runner molding operation, will automatically harden or gel at the orifices of the transfer passages when the mold is opened, even though they are still substantially fluid in the passages. Such gelling overcomes the tendency to discharge into the open mold cavity. However, it has been found that hot plasticized nylon remaining in the transfer passages will normally continue to discharge from the passage orifices into an opened mold cavity, even though injection pressure has been removed resulting in the production of long hardened nylon strings which usually form not only in the open mold cavity but also across the surfaces of the mold section on either side of the cavity. The presence of the hardened nylon strings on a mold surface prevents complete closure of the mold and, hence, results in the formation of flash in subsequent molding operations. Further, if parts of the mold are formed from relatively soft materials, such as a beryllium copper alloy, it will be found that the hard strings of nylon, during molding operations, will cause grooves and depressions to form in the surface of the beryllium copper part, thereby destroying their effectiveness in the formation of articles of predetermined dimensions. Accordingly, it would be necessary to clean the mold cavity and surrounding surfaces after each molded article was formed which, of course, would markedly reduce the advantages of using the high speed automatic injection molding machines. In some instances, the foregoing disadvantages have been partially overcome by moving the injection nozzle of the heating cylinder away from the transfer passages. However, this has not completely solved the problem as hot plasticized molding composition is still present in the transfer passages of the sprue section and, accordingly, available for discharge from sprue section orifices.

It is the primary object of this invention, therefore, to improve injection molding techniques and, in particular, those techniques which are concerned with "hot runner" molding operations.

Another object of this invention is to provide a mechanism for preventing further discharge of molding composition into an open mold cavity after the injection step has been completed and the mold opened for removal of the molded article.

Another object is the provision of an automatic valve arrangement which operates to close and open a molding composition discharge orifice immediately preceding the cavity simultaneously with the opening and closing of the mold.

A further object is to provide a mechanism for accomplishing the foregoing objects which may be readily associated with and formed as part of a standard mold assembly.

A further object is to provide a means for modifying standard injection molding equipment which will permit nylon and other molding compositions having similar characteristics to be injection molded in such equipment. These and other objects will become more apparent from the accompanying drawings and the following specification.

Figure 1 is a partial diagrammatic view, partly in cross-section, of the platens and mold assembly of an injection molding machine and illustrating the improvement contemplated by the present invention.

Figure 2 is a sectional view taken along the line 2—2 of Figure 1.

Figure 3 is a view similar to that of Figure 1 showing the mold assembly in a partially opened condition.

As was previously indicated above, this invention is concerned with an improvement of injection molding machines, of the type, for example, as is illustrated in the aforementioned patent to Kelly. Such machines are adapted to plasticize a preselected molding composition, inject the plasticized composition into a mold cavity, eject the molded article from the mold cavity and automatically repeat the cycle. The improvement of the present invention is primarily directed to a mechanism associated with the mold assembly which will prevent discharge of hot plasticized molding composition into the open cavity of a mold and across other surfaces of mold sections when the mold is open.

Turning now to the drawings, the numerals 10 and 11 indicate platens of an injection molding machine. Platen 10 is normally held stationary while platen 11 is adapted, through a suitable mechanism not shown, to be moved longitudinally away from and toward platen 10. Disposed between the platens is a mold assembly indicated, generally, by the letters "MA," which includes a mold and associated supports, brackets, etc. The mold assembly may be considered as divided into two halves, one half being associated with stationary platen 10 and the other half being associated with the movable platen 11.

In the molding art, certain terms have been adopted through general usage. For example, the usual mold is composed of two primary parts and, in referring to these two parts, it is customary to call one the "cavity" section and the other the "core" section. Such terminology results from the fact that one such section is generally provided with a recess while the other section is provided with a complementary projection or core. When the two mold sections are brought together, the projection or core is inserted into the recess, although not completely filling the latter, thereby forming an enclosed molding cavity. Customary terminology, accordingly, is used herein to describe the invention.

That half of the mold assembly attached to platen 10 includes a sprue section 12 which, in turn, has secured thereto a cavity section 13. Attached to the movable platen 11 is a base or support 14 to which, in turn, is secured a core section 15. The sprue section 12 and base 14 may be attached to their associated platens by any appropriate means as, for example, the bolts 16. Sprue section 12 and cavity section 13, as well as base 14 and core section 15, while formed as separate elements, are normally joined together, with their respective platens, as an integral unit. In accordance with the present invention, special means are provided which permit reciprocal transverse movement of cavity section 13 on sprue section 12, and core section 15 on base 14, this means being further described hereinafter.

In a closed position, the opposing surfaces of the two mold sections are adapted to have a flush engagement, the parting line of the sections being indicated by the numeral 17.

Positioned in and extending through platen 10 is a sprue bushing 18 containing a molding composition transfer passage 19. An injection nozzle 20, associated with the usual heating cylinder and ram assembly, not shown, is adapted to engage with seat 21 of bushing 18 at the inlet of passage 19. Passage 19 is connected with a passage 22 formed within the body of sprue section 12. As shown, passage 22 terminates in one or more tapering connected passages 23 disposed at right angles. Molding composition is transferred from the nozzle 20 through the interconnected passages into a mold cavity. As indicated in the drawings, passage 23 extends through a nozzle-like projection 24 of sprue section 12. Nozzle-like projection 24 is adapted to extend into a complementary, but somewhat larger, recess 25 provided in cavity section 13. The flat terminal face 26 of projection 24 is constructed so as to have a flush but slideable engagement with the bottom 27 of recess 25.

Cavity section 13 is provided with a second mold cavity-forming recess 28 adapted to receive core 29, formed integrally with and projecting from core section 15. As shown, the core 29 has depressions in its surface corresponding to the configurations required of an article to be molded, whereby, when the core is inserted into the recess 28, a mold cavity of a desired shape and size will be formed. Extending from the mold cavity to the bottom of recess 25 is a relatively small passage or inlet 31, the entrance to which is aligned with the opening or orifice 32 of passage 23 when plastic molding composition is to be introduced into the mold cavity.

As shown in Figure 2, heating means 33, which may be electrical resistance elements, are provided in sprue section 12 in the vicinity of the passages 22 and 23 to maintain the molding composition in these passages in a plastic or fluid state at all times. This particular feature of providing heat in the sprue section immediately surrounding the transfer passages is the basis for the term "hot runner."

Secured to the sprue section by appropriate means is an elongated, obtuse cam C. The longer leg 36 of the cam C is adapted to ride in a cam track or guide formed by guide elements 37 and 38 which are attached to the core section 15. The lower end of the longer leg 36 of the cam should preferably be rounded, as is shown, to assist in realigning the end of the cam in the cam track in the event it is withdrawn during the operation, as hereinafter described.

Extending between cavity section 13 and core section 15 is a guide pin 42. Guide pin 42 is secured to cavity section 13 and has its lower extremity removably retained in a complementary recess 43 provided in core section 15. Usually, a plurality of such guide pins are provided for a given mold assembly and serve to align the two mold sections during the opening and closing of the mold.

As previously indicated, cavity section 13 is secured to sprue section 12 but in a manner which will permit reciprocal transverse movement of the former on the latter. Correspondingly, core section 15 is secured to base 14 but in a manner which permits the former to move transversely relative to the latter. The means by which the cavity and core sections are united to the sprue section and base, respectively, to permit such transverse movement, is best illustrated in Figure 2. In this figure, there is shown a gib 44 secured to cavity section 13. The gib 44 is adapted to ride in a complementary recess 45 formed in sprue section 12. Likewise, base 14 is provided with a gib 46 adapted to ride in a complementary recess 47 formed in core section 15.

In operation, the mold assembly is initially closed, with the opposing surfaces of the core section and cavity section being in flush engagement at the parting line 17 and the core 29 extending into the cavity 28. Also, in the closed position, orifice 32 of nozzle-like projection 24, extending into recess 25, is adapted to be automatically aligned with the entrance of passage 31 of the cavity section. When the mold is closed, with all of the various component parts disposed in the aforementioned relationship as illustrated in Figure 1, plasticized molding composition from a heating cylinder is forced under pressure from the injection nozzle 20 into passage 19, through passages 22 and 23 and then into the cavity 30. After the cavity has been completely filled with molding composition, the injection operation is stopped and the part is then ready for removal, unless a short cooling period is required. To open the mold, platen 11 is moved longitudinally away from platen 10. As platen 11 moves away from platen 10, it carries with it that part of the mold assembly to which it is attached, namely, base 14 and core section 15. However, by reason of the angle of leg 36 of cam C and its coaction with guide elements 37 and 38, core section 15 is forced sideways on the gib 46, or toward the left of Figure 1. The resulting motion, therefore, of core section 15, as the mold is opened, is simultaneously both sideways and longitudinally away from cavity section 13. During the aforementioned movement, leg 36 of the cam is, correspondingly, withdrawn from between the guide elements 37 and 38.

In view of the fact that core 29 extends upwardly into the cavity section and, also, in view of the guide pins 42 extending between the cavity and core sections, any sideways movement of the core section 15 will automatically impart a corresponding sideways movement to cavity section 13, until such time as platen 11 has been removed far enough so as to permit the core 29 to be completely withdrawn from the recess 28 and guide pin 42 to be likewise withdrawn from recess 43. Both mold sections must be moved simultaneously sideways in the same direction and at the same rate, as the core is withdrawn from the recess 28, in order to prevent shearing of the molded article in the cavity.

The sideways movement of the cavity section 13, relative to the stationary sprue section 12, operates as a valve to shut off further discharge of plasticized molding composition from orifice 32 of passage 23. This is accomplished by reason of the fact that, as cavity section 13 is moved sideways, the enlarged recess 25 permits passage 31 to be moved out of alignment with orifice 32, the latter being then closed by the bottom 27 of the recess 25. The new positions of the respective components as the mold is opened are illustrated in Figure 3. When the components are disposed as is shown in Figure 3, it is readily apparent that plastized molding composition cannot be discharged into the opening molding cavity or recess 28 from orifice 32. Accordingly, molding materials, such as nylon, for example, may be readily molded in automatic injection molding equipment without presenting the previously mentioned problem of drooling or continuing to discharge over the various mold parts.

Preferably, the leg 36 of cam C is not completely withdrawn from between guides 37 and 38 in order to provide positive control over the movement of core section 15. However, if desirable, the cam could be so dimensioned as to be completely withdrawn from between guides 37 and 38 and other appropriate means provided for stopping and controlling the movement of core section 15 as well as cavity section 13 after a predetermined distance of travel.

When core 29 has been withdrawn a sufficient distance, the molded article A which normally is carried with the core, may be ejected from the assembly. To assist in ejecting the molded article, standard ejector pins, not shown, may be disposed in the core section and operated in timed sequence with the withdrawal of the core section to force the molded article A from the core 29.

When the molded article has been removed from the core section, the mold may then be automatically closed by moving platen 11 towards platen 10, thereby placing the mold assembly in position for the next injection cycle. As platen 11 is moved towards platen 10, the action of cam C riding between guides 37 and 38 will cause core section 15 to move, not only toward cavity section 13, but, also, sideways in a direction opposite to that imparted when opening the mold. Correspondingly, because of the extension of guide pin 42 into recess 43, the sideways movement of core section 15 will be transmitted to cavity section 13 and this section will also move back into its normal closed position along with core section 15 upon continued advancement of platen 11.

Accordingly, it will be seen that the mechanism described will readily permit the use of a "hot runner" molding operation and eliminate the problem of drool, which presents an appreciable disadvantage, especially in connection with nylon molding compositions.

While one embodiment of the mechanism for accomplishing the object of the invention has been disclosed and described, it will be appreciated that other similar mechanisms may be developed which will, likewise, achieve the same results. For example, the same relative movement of the parts can be obtained if a cam somewhat analogous to cam C were secured to the base 14 rather than the sprue section, with its upper extremity adapted to ride in a cam track attached to the sprue section. Further, it is apparent that the rate and extent of transverse travel of the cavity and core sections can be controlled by the angle of the cam leg.

Having described certain exemplary embodiments of the invention, the same is intended to be limited only by the scope of the following claims.

I claim:

1. A mold assembly including two complementary mold sections adapted to form a mold cavity when said sections are in their closed position, a sprue section provided with a plastic molding composition transfer passage terminating in an orifice adapted to be aligned with an inlet of said cavity, one of said mold sections being joined as a composite unit with said sprue section but capable of reciprocal transverse movement thereon, the second mold section joined as a composite unit with a support but capable of reciprocal transverse movement thereon, means to impart the same transverse movement to both of said mold sections simultaneously with the opening and closing of the mold, and means for closing and opening the orifice of said passage upon reciprocal transverse movement of said mold sections.

2. A mold assembly including two complementary mold sections adapted to form a mold cavity when said sections are in their closed position, a sprue section provided with a plastic molding composition transfer passage terminating in an orifice adapted to be aligned with an inlet of said cavity, one of said mold sections being joined as a composite unit with said sprue section but capable of reciprocal transverse movement thereon, the second mold section joined as a composite unit with a support but capable of reciprocal transverse movement thereon, means to impart reciprocal transverse movement to the second mold section simultaneously with the opening and closing of the mold, means extending between said mold sections whereby the same transverse movement of said second mold section is imparted to the first named mold section, and means for closing and opening the orifice of said passage upon reciprocal transverse movement of said mold sections.

3. A mold assembly as described in claim 2 wherein the means to impart transverse movement to said second mold section comprises an elongated cam, one end of which is secured to said sprue section and the opposite end of which is adapted to slide in a cam track secured to said second mold section.

4. A mold assembly including two complementary mold sections adapted to form a cavity when said mold sections are in their closed position, a sprue section provided with a plastic molding composition transfer passage terminating in an orifice adapted to be aligned with an inlet of said cavity, one of said mold sections being joined as a composite unit with said sprue section but capable of reciprocal transverse movement thereon, the second mold section joined as a composite unit with a support but capable of reciprocal transverse movement thereon, an elongated cam having one end attached to said support, a cam track attached to said first named mold section and adapted to slideably receive the opposite end of said cam whereby opening and closing of the mold will impart transverse movement to said first named mold section, means extending between said mold sections to impart the same transverse movement to said second named mold section simultaneously with the transverse movement of said first named mold section and means for closing and opening the orifice of said passage upon reciprocal transverse movement of said first named mold section.

5. A mold assembly including two complementary mold sections adapted to form a mold cavity when said sections are in their closed position, a sprue section provided with a plastic molding composition transfer passage terminating in an orifice adapted to be aligned with an inlet of said cavity, one of said mold sections being joined as a composite unit with said sprue section but capable of reciprocal transverse movement thereon, said sprue section having a nozzle-like projection extending from that surface adjacent to said mold section and terminating in a flat extremity, said passage extending through and having its discharge orifice in the flat extremity of said nozzle-like projection, an enlarged flat-bottomed recess disposed in the opposing face of said mold section adapted to receive said nozzle-like projection, the inlet of said cavity extending from the flat bottom of said recess, the flat extremity of said nozzle-like projection being in sliding engagement with the flat bottom of said recess, the second mold section being joined as a composite unit with a support but capable of reciprocal transverse movement thereon, and means to impart transverse movement in the same direction to both of said mold sections simultaneously with the opening and closing of the mold whereby the transverse movement of said first named mold section operates to close and open the orifice of said passage.

6. A mold assembly as described in claim 5 wherein the means to impart transverse movement to said mold sections includes an elongated cam having one end secured to said sprue section and its other extremity adapted to slide in a cam track attached to the second mold section.

7. A mold assembly as described in claim 5 wherein the means to impart transverse movement to said mold sections includes an elongated cam having one end secured to said second mold section support and having its other extremity adapted to slide in a cam track attached to the first mold section.

8. In an injection molding apparatus a stationary platen, a second platen adapted for reciprocal movement toward and away from said stationary platen, a sprue section secured to said stationary platen having a passage extending therethrough for transfer of plastic molding composition from a source of supply to the inlet of the mold cavity, a first mold section transversely movable on said sprue section and having an inlet for the mold cavity, the orifice of said passage and the entrance of said cavity inlet being disposed in opposing surfaces of said sprue section and said first mold section respectively, a second mold section transversely movable on said second platen, said mold sections adapted to form a mold cavity when in their closed position, and means to impart the same transverse movement to both of said mold sections simultaneously with the opening and closing of the mold whereby the orifice of said passage is correspondingly closed and opened with respect to communication with the inlet of said cavity.

9. In an injection molding apparatus a stationary platen, a second platen adapted for reciprocal movement toward and away from said stationary platen, a sprue section secured to said stationary platen, a flat-faced nozzle-like projection extending from the opposite side of said sprue section, a passage extending through said sprue section for the transfer of plastic molding composition from a source of supply to the inlet of the mold cavity and having its orifice disposed in the flat face of said nozzle-like projection, a first mold section transversely movable on said sprue section and provided with an enlarged flat-bottomed recess adapted to receive said nozzle-like projection, the face of said projection and the bottom of said recess being in sliding engagement, the entrance to said cavity inlet being disposed in the bottom of said recess, a second mold section transversely movable on said second platen, said mold sections adapted to form a mold cavity when in their closed position and means to impart the same transverse movement to both of said mold sections simultaneously with the opening and closing of the mold whereby the orifice of said passage is correspondingly closed and opened with respect to communication with the inlet of said cavity.

10. In an injection molding apparatus a stationary platen, a sprue section attached to said stationary platen and provided with a passage for transfer of plastic molding composition to a mold cavity, a transversely movable cavity section secured to said sprue section, a second platen adapted for reciprocal movement toward and away from said stationary platen, a transversely movable core section secured to said second platen, said cavity section and said core section adapted to form a mold cavity when said sections are in their closed position, an elongated cam attached to said sprue section, a cam track attached to said core section and adapted to receive the outer extremity of said cam, said cam being adapted to impart transverse movement to said core section upon withdrawal of said second platen away from said stationary platen, means extending between said cavity and core sections for imparting the same transverse movement to said cavity section simultaneously with the transverse movement of said core section, and means for closing and opening the outlet of said passage upon reciprocal transverse movement of said cavity section occurring simultaneously with the opening and closing of said mold cavity.

11. In an injection molding apparatus a stationary platen, a sprue section attached to said stationary platen and provided with a passage for transfer of plastic molding composition to a mold cavity, a transversely movable cavity section secured to said sprue section, a second platen adapted for reciprocal movement toward and away from said stationary platen, a transversely movble core section secured to said second platen, said cavity section and said core section adapted to form a mold cavity when said sections are in closed position, an elongated cam connected with said second platen, a cam track attached to said cavity section and adapted to receive the outer extremity of said cam, said cam being adapted to impart transverse movement to said cavity section upon withdrawal of said second platen away from said stationary platen, means extending between said cavity and core sections for imparting the same transverse movement to said core section simultaneously with the transverse movement of said cavity section, and means for closing and opening the outlet of said passage upon reciprocal transverse movement of said cavity section occurring simultaneously with the opening and closing of said mold cavity.

References Cited in the file of this patent

UNITED STATES PATENTS

| | | |
|---|---|---|
| 2,372,177 | Conner | Mar. 27, 1945 |
| 2,585,204 | Wondra | Feb. 12, 1952 |